United States Patent [19]

Duncan

[11] 4,275,318
[45] Jun. 23, 1981

[54] MAGNETOHYDRODYNAMIC METHOD AND APPARATUS FOR CONVERTING SOLAR RADIATION TO ELECTRICAL ENERGY

[76] Inventor: Fred A. Duncan, 325 Hawthorne St., Brooklyn, N.Y. 11225

[21] Appl. No.: 907,277

[22] Filed: May 18, 1978

Related U.S. Application Data

[63] Continuation-in-part of Ser. No. 641,291, Dec. 16, 1975, abandoned.

[51] Int. Cl.³ .............................................. H02N 4/02
[52] U.S. Cl. .................................. 310/11; 331/94.5 P; 331/DIG. 1
[58] Field of Search ........................... 310/11; 376/4.3; 331/DIG. 1, 94.5 P

[56] References Cited

U.S. PATENT DOCUMENTS

| | | | |
|---|---|---|---|
| 3,318,094 | 5/1967 | Koller | 310/11 UX |
| 3,354,328 | 11/1967 | Maitland | 310/11 |
| 3,480,806 | 11/1969 | Berberich | 310/11 |
| 3,584,312 | 6/1971 | Statz | 330/4.3 |
| 3,748,505 | 7/1973 | Lavaring | 310/11 |
| 3,899,696 | 8/1975 | Fletcher et al. | 331/DIG. 1 |
| 4,006,431 | 2/1977 | Röss | 331/94.5 P |
| 4,134,034 | 1/1979 | Dardai et al. | 310/11 |

OTHER PUBLICATIONS

M. E. Talaat, "MPE Power Generation Under Conditions Compatible With Magnetically Induced Nonequilibrium Ionization", (Advanced Power Technology Company, Inc.), *Proc. MHD Electric Power Generation Symposium*, (No. 37), pp. 363, 365-374, (Paris 1964).

D. Balfour and J. H. Harris, "Photoionization in MPD Generators", (Sunderland Technical College)—*Proc. MHD Electric Power Generation Symposium*, (No. 9), pp. 160-178, (Paris 1964).

M. E. Talaat, "Magnetoplasmadynamic Electrical Power Generation With Nonequilibrium Ionization", *Advanced Energy Conservation*, vol. 3, pp. 595-611 (1963).

*Proceedings—MHD Electric Generation Symposium*, Kings College, University of Durham, Newcastle-Upon-Tyne (1962): (a) A. Maitland, "A Criterion for Assessing Methods of Producing Non-Equilibrium Ionization"; (b) E. F. Brocher, The Evaluation of Electron Temperature in M.P.D. Generators and Its Effect on the Gas Conductivity; (c) L. S. Dzung, Hall Effect and End-Loop Losses in M.P.D. Generators; (d) I. R. McNab and C. A. Robinson, Electron-ion Recombination in M.P.D. Generators; and (e) J. C. Wu, Effects of Viscosity in M.P.D. Generators.

*Primary Examiner*—Donovan F. Duggan
*Attorney, Agent, or Firm*—Pennie & Edmonds

[57] ABSTRACT

A method for converting radiative energy, such as coherent laser radiation or non-coherent solar radiation, to electrical energy using a magnetohydrodynamic (MHD) electrode system comprises the steps of: (1) forming a magnetic pinching field for and directing moving charged particles through the MHD electrode system; (2) supplying an ionizable working substance within the magnetic pinching field; and (3) applying radiative energy to the working substance in order to produce moving charged particles therefrom, whereby the moving charged particles are and directed through the MHD electrode system for generating electrical energy. Residual radiative energy and recombined working substance are recycled in a fully enclosed system. In one preferred embodiment, the magnetic pinching field is formed along the major axis of an ellipsoidal reflecting surface, and the radiative energy is focused at the foci of the ellipsoidal surface with the consequence that the reflected energy is repeatedly focused at the foci. In another preferred embodiment, the magnetic field is formed along the longitudinal axis of an elongated enclosure, and radiative energy is directed through the enclosure along the longitudinal axis. Apparatus for practicing this method is also described.

7 Claims, 10 Drawing Figures

MAGNETOHYDRODYNAMIC METHOD AND APPARATUS FOR CONVERTING SOLAR RADIATION TO ELECTRICAL ENERGY

CROSS-REFERENCES TO RELATED APPLICATIONS

This application is a continuation-in-part of applicant's copending application, Ser. No. 641,291, filed Dec. 16, 1975, and now abandoned which is incorporated herein by reference.

BACKGROUND OF THE INVENTION

1. Field of the Invention

This invention relates to magnetohydrodynamic methods and apparatus for converting radiative electromagnetic signals as energy, such as non-coherent, coherent, and particle beam radiation, into electrical energy.

2. The Nature of Magnetohydrodynamic Effect

A magnetohydrodynamic generator is an apparatus for generating electrical power from the kinetic energy of charged particles in a flowing conductive fluid. In such a generator, positive and negative charged particles are forced to flow through an MHD electrode system which includes a magnetic field. The magnetic field and the flow direction are perpendicular to a pair of electrodes spaced apart on either side of the flow path. In operation, the magnetic field, in accordance with Faraday's Law, induces an electromotive force in the moving fluid. If suitable electrodes are used to make contact with the moving fluid, and are connected to a load, current will flow in the fluid, and energy is delivered from the fluid to the load.

3. History of the Art

Although scientists have known about the magnetohydrodynamic effect for many years, it has never been heretofore considered a practical method for converting radiative energy to electricity. Instead, the MHD effect has been explored largely as a substitute for conventional generators in converting fossil fuels into electricity. Proposed MHD generators for these applications typically formed charged particles from heating a working fluid, as in conduction heating, and applying an ionizing electrical discharge across the heated fluid.

The shortcomings of these conventional generators are manifold. Such systems typically utilize ionized gas flow at high speeds, often in the supersonic Mach 2 or Mach 5 regions, and they are maintained at high temperatures, often in excess of the melting point of typical structural materials. Moreover, the maintenance and control of electrical discharges in a plasma flowing at supersonic speeds is exceedingly difficult. As a consequence, the plasma generated is not uniform in cross section or in time. Furthermore, these systems generate waste combustion by-products which cannot be recycled within the system and must be disposed of in a non-polluting manner. These shortcomings have prevented MHD electrical power generation from becoming a practical means of electrical power generation.

The foreseeable need is for a new approach to MHD generation which will convert radiative energy into electrical energy without the necessity of intermediate chemical reactions.

SUMMARY OF THE INVENTION

In accordance with the present invention, a method for converting radiative energy, such as coherent laser radiation or non-coherent solar radiation, to electrical energy using a magnetohydrodynamic (MHD) electrode system comprises the steps of: (1) forming a magnetic pinching field for and directing moving charged particles through the MHD electrode system; (2) supplying an ionizable working substance within the magnetic pinching field; and (3) applying radiative energy to the working substance in order to produce moving charged particles therefrom, whereby the moving charged particles are directed to the MHD electrode system for generating electrical energy. Residual radiative energy and recombined working substance are recycled in a fully enclosed system. In one preferred embodiment, the magnetic pinching field is formed along the major axis of an ellipsoidal reflecting surface, and the radiative energy is focused at the foci of the ellipsoidal surface with the consequence that the reflected energy is repeatedly focused at the foci. In another preferred embodiment, the magnetic field is formed along the longitudinal axis of an elongated enclosure, and radiative energy is directed through the enclosure along the longitudinal axis. Apparatus for practicing this method is also described.

BRIEF DESCRIPTION OF THE DRAWINGS

The nature, advantages and various features of the invention will appear more fully upon consideration of the illustrative embodiments now to be described in detail in connection with the accompanying drawings.

In the drawings.

For convenience of reference, the same structural elements are denoted by the same reference numerals throughout the drawings.

DETAILED DESCRIPTION OF THE DRAWINGS

1. First Embodiment of MHD Generating Apparatus (FIGS. 1-3)

Figure 1:
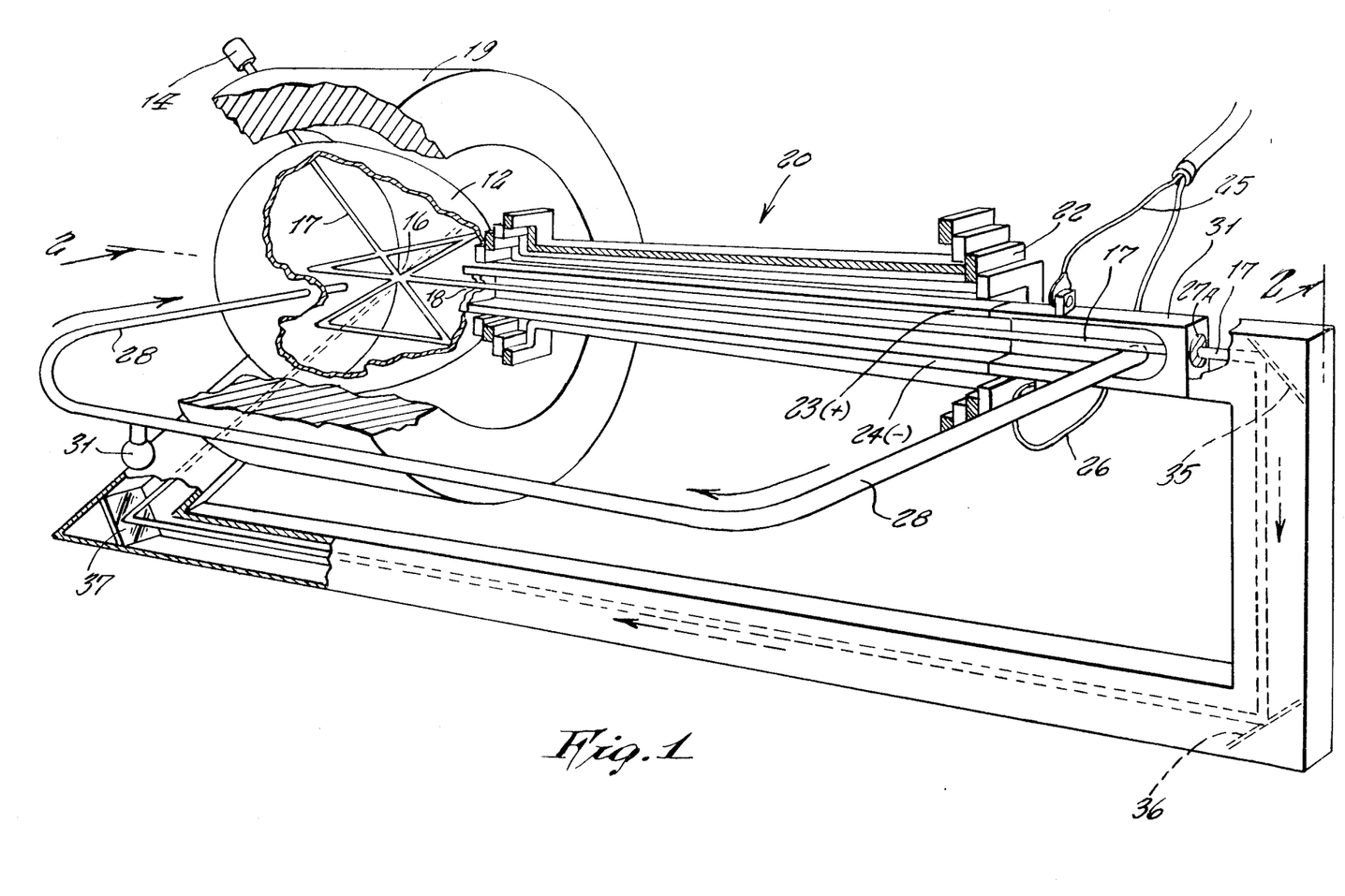
FIG. 1 is a schematic perspective view of a preferred embodiment of generating apparatus for converting radiative energy into electrical energy.
Figures 2, 2A, 3:
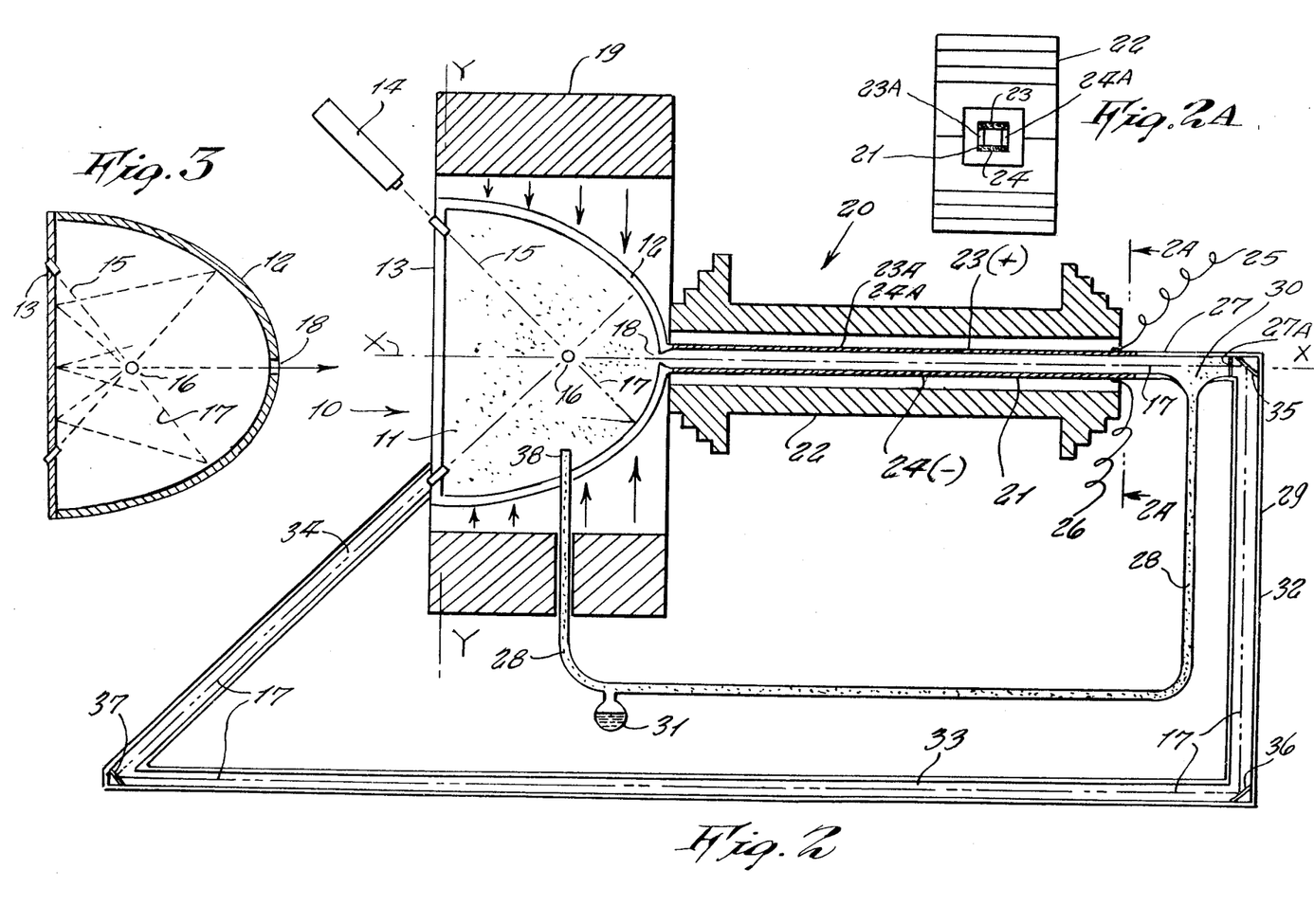
FIGS. 2 and 2A are longitudinal and transverse cross sections, respectively, of the apparatus of FIG. 1.
FIG. 3 is a cross section of the apparatus of FIG. 1, taken through the longitudinal axis of the ionization enclosure, particularly illustrating the reflection characteristics of the reflecting surfaces.

Referring to the drawings, FIGS. 1-3 illustrate a first embodiment of MHD generating apparatus particularly useful for converting radiative energy to electrical energy. In substance, the generating apparatus comprises enclosure means 12, typically referred to as an ionization chamber, for confining an ionizable working substance 11, such as cesium. Magnetic field generating means 19, such as a superconductive magnet, is provided for generating a magnetic pinching field enclosing the chamber for concentrating and directing moving charged particles into an MHD electrode system 20, often referred to as an MHD duct. Radiative energy application means 14, preferably in the form of a directed, focused laser, is provided for applying to the working substance in the magnetic pinching field, radiative energy 17 of sufficient intensity to produce moving charged particles from the working substance, i.e., the radiative energy ionizes the working substance by charge transfer processes and additionally imparts kinetic energy to the resulting charged particles.

In the preferred embodiment, the magnet 19 forms a pinching field which compresses moving charged particles into a substantially linear region of space along the longitudinal x-axis of the apparatus. The MHD electrode system is aligned along this linear region so that the pinching field, radially confining the moving charged particles along the longitudinal axis, thus directs them through the MHD system.

The radiation application means is rendered highly efficient by providing, preferably on the surface of enclosure 12, at least a portion of a substantially ellipsoidal reflecting surface having a major axis and one or more foci 16. Here a semi-ellipsoidal reflecting surface is provided with a transverse planar reflecting surface 13 disposed along the minor axis (y-axis) of the ellipsoidal portion. The major axis of the ellipsoidal portion is aligned along and coincident with the longitudinal axis of the apparatus. In this arrangement, the radiative energy 17 is directed through a portion of the linear region of space wherein the charged particles are concentrated.

Preferably, the radiation is directed onto and focused within this linear region at foci 16, with the result that radiative energy impinging on the ellipsoidal reflecting surface is redirected by reflection to the region of charged particle concentration and refocused at the foci. This redirection and refocusing at the foci is multiply repeated. With each repetition, the angle between the reflected beam of radiation and the major axis diminishes until the beam eventually collapses along the axis and enters the MHD electrode system axially through the aperture 18.

The MHD electrode system 20 can be connected to enclosure 12 at aperture 18 and aligned with the longitudinal axis. It will typically comprise a pair of electrodes 23 and 24 and a magnetic means 22 for generating both a compressing magnetic pinching field and a magnetic field mutually perpendicular to both the longitudinal axis and the direction between electrodes 23 and 24. As shown in FIG. 2A, electrodes 23 and 24 can be conveniently spaced apart by insulating walls 23A and 24A to define a duct 21 through which charged particles and recombined fluid will flow. In operation, charged particles driven into duct 21 are magnetically directed to opposing electrodes producing a potential difference therebetween. This potential difference can, via electrical leads 25 and 26, drive an electrical current through an external load (not shown).

In this preferred arrangement, recycling means are provided for cycling residual radiative energy and recombined working substance passing through the MHD electrode system. Specifically, return duct means 28 secured to the rear end of MHD electrode system 20 provides a closed duct system for returning recombined working substance to enclosure 12 through opening 38. Preferably, the return duct path includes a fluid reservoir 31. Ray conduit means 29 comprising segments 32, 33, and 34 can utilize guiding reflecting surfaces, such as inclined mirrors 35, 36, and 37, guides residual energy passing through duct 21 back to enclosure 12 and preferably redirects and refocuses the residual radiation onto one or more foci 16. A transparent window 27A prevents plasma entry into the ray conduit.

In the operation of this device, magnet 19 is activated to form the magnetic pinching field concentrated along the longitudinal axis of enclosure 12. Ionizable cesium working fluid from reservoir 31 diffuses, as gas, into the enclosure 12, and is thus supplied within the pinching field. Radition energy directed into the enclosure impinges on the gaseous cesium atoms, ionizing them by charge transfer processes and imparting kinetic energy to the charged particles of the resulting nonequilibrium plasma.

The moving charged particles interact with the magnetic pinching field which reflects them so that the plasma concentrates along the longitudinal axis of enclosure 12. This magnetic pinching effect, combined with an increase in temperature due to magnetic compressing and radiation excitation pressures produces a relatively high pressure which drives charged particles along the axis, through aperture 18 and through MHD electrode system 20 where they produce a potential difference between electrodes 23 and 24 in accordance with the conventional magnetohydrodynamic principles. Upon contacting the electrodes, the cesium ions recombine to form neutral cesium atoms.

The recombined cesium and the residual radiation passing through the MHD electrode system are recycled through the generator by return duct 28 and the ray conduit means 29, respectively.

2. Modified First Embodiment Employment A Full Ellipsoidal Reflecting Surface (FIG. 4)

Figure 4:
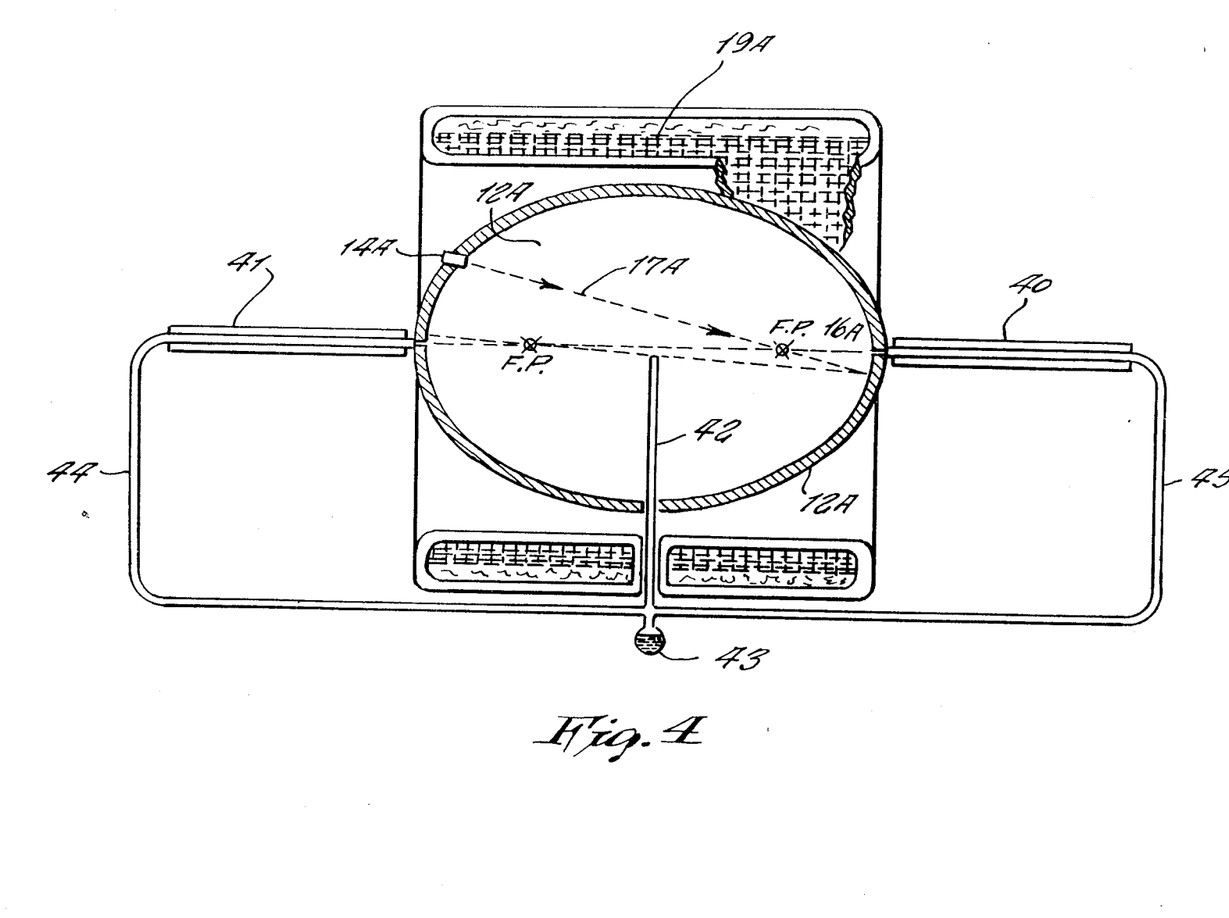
FIG. 4 illustrates, in longitudinal cross section, a first modified form of the apparatus of FIG. 1, utilizing an ionization enclosure with a full ellipsoidal reflecting surface.

FIG. 4 illustrates a modified form of the embodiment of FIG. 1 wherein the enclosure 12A comprises a substantially full ellipsoidal optical reflecting surface and a pair of MHD electrode systems 40 and 41 secured at each apex of the ellipsoid. In this arrangement, input radiation 17A can be applied by focusing at either of the foci 16A and a plasma flow of charged particles will be generated symmetrically through both MHD electrode systems. Recombined working substance is returned to enclosure 12A via return ducts 44 and 45, a common duct 42 and reservoir 43. The operation of this apparatus is substantially identical to that described in connection with FIG. 1.

3. Modified First Embodiment Employing A Vortex Chamber (FIG. 5)

Figure 5:
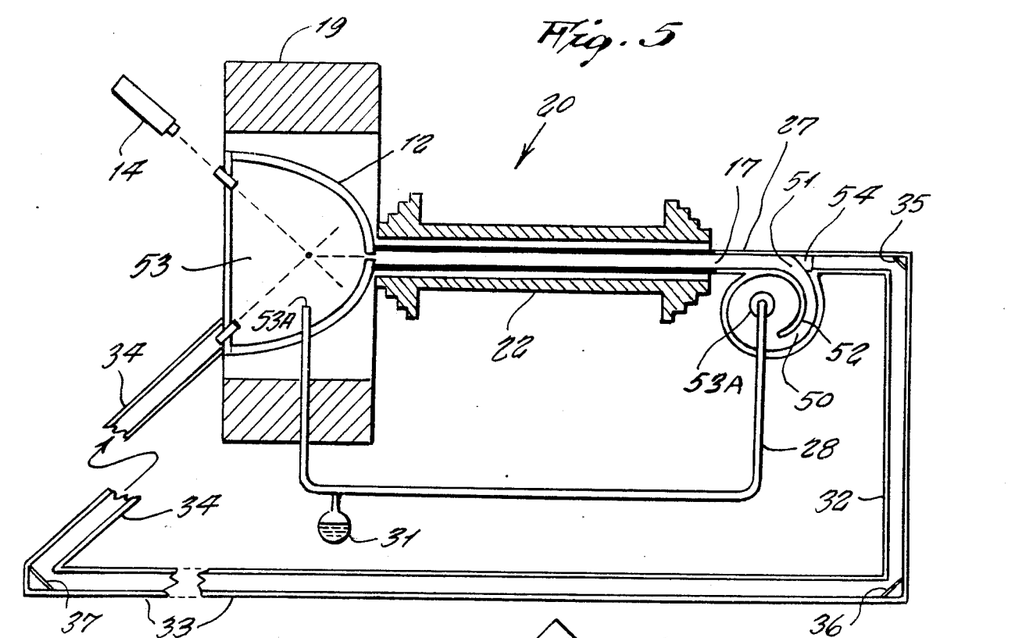
FIG. 5 illustrates, in longitudinal cross section, a second modified form of the apparatus of FIG. 1, utilizing a vortex chamber.

FIG. 5 illustrates a modified form of the embodiment of FIG. 1 further comprising a vortex chamber 50 disposed in the working substance recycling path preferably at the output of MHD electrode system 20. The vortex chamber comprises an inlet 51 and a curved vane 52 for directing fluid in a spiraling fashion into a central chamber 53A. Conveniently, lens 54 aligned with the axis of duct 21 is provided for directing residual radiation 17 to the ray conduit 32.

The vortex chamber provides an enlarged outflow expansion area for the fluid as compared to the outlet shown in FIG. 2, and thus permits a greater volume of fluid to expand gaseously and leave the duct 21 in a manner which prevents back flow, thereby providing a steadier continuous flow of recycled working fluid to the ionization enclosure 12.

4. Generating System Employing A Plurality Of Interconnected Generators (FIG. 6)

Figure 6:
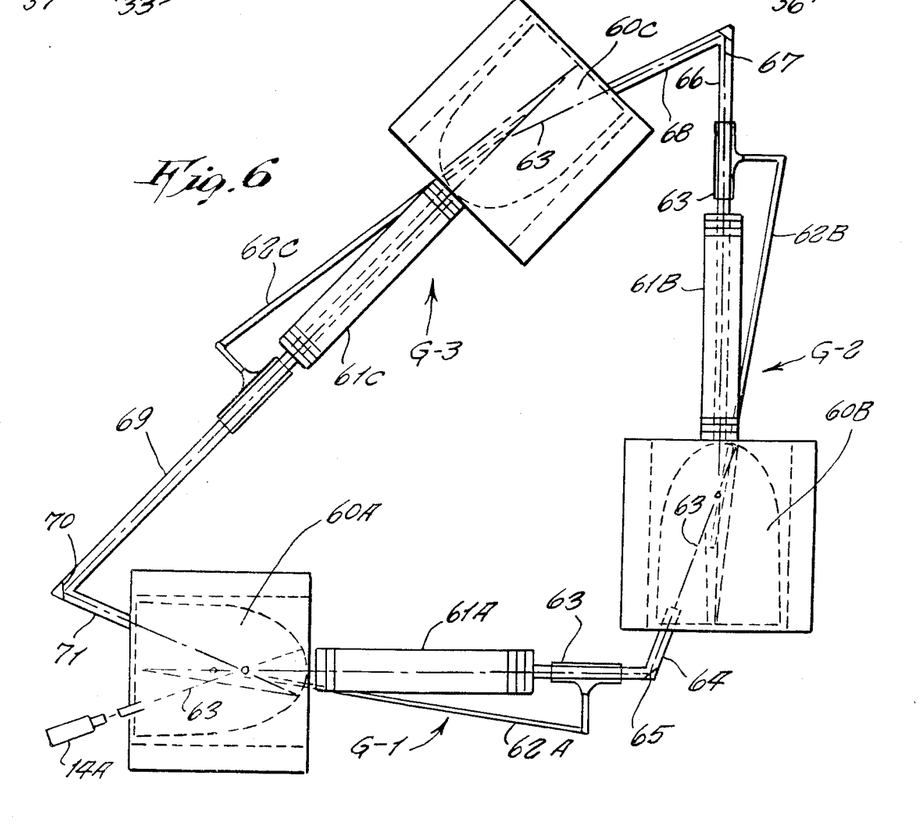
FIG. 6 illustrates, in schematic view, a generating system using a plurality of interconnected generating apparatus of the type illustrated in FIG. 1.

FIG. 6 illustrates a generating system comprising a plurality of generators G-1, G-2, and G-3, of the type described in connection with FIGS. 1-3. The respective generators have ionization chambers 60A, 60B, and 60C; MHD electrode systems 61A, 61B, and 61C; and return ducts 62A, 62B, and 62C. In this arrangement, residual radiation 63 from generator G-1 passes through MHD duct 61A and is directed by mirror 65 via ray conduit 64 into enclosure 60B of generator G-2. Similarly, residual radiation from generator G-2 is recycled via ray conduits 66 and 68 and by mirror 67 into generator G-3, and that of generator G-3 is recycled via conduits 69 and 71 and by mirror 70 to generator G-1.

5. Second Embodiment of MHD Generating Apparatus (FIGS. 7 and 8)

Figure 7:
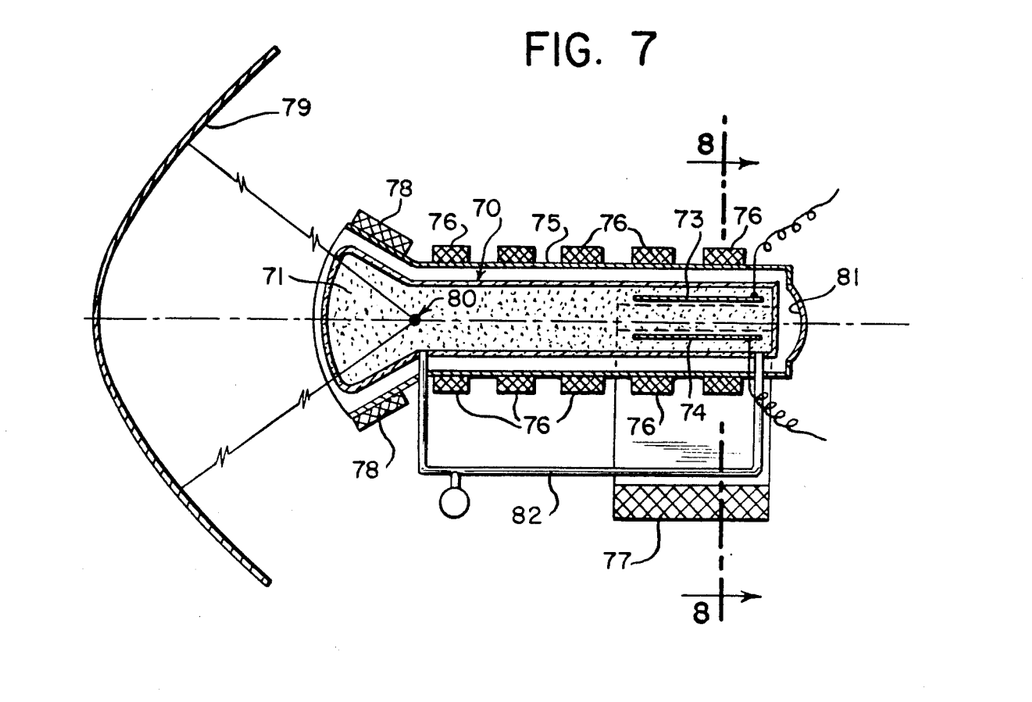
FIG. 7 illustrates, in longitudinal cross section, a second embodiment of MHD generating apparatus in accordance with the invention.
Figure 8:
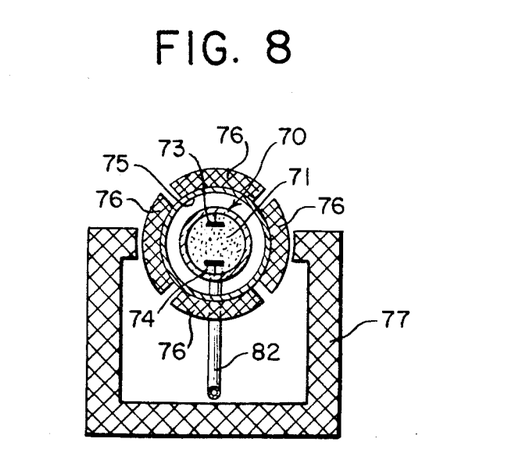
FIG. 8 is a transverse cross section of the apparatus shown in FIG. 7.

FIGS. 7 and 8 illustrate a second embodiment of MHD generating apparatus particularly useful for converting noncoherent solar radiation into electrical energy. In substance, the generating apparatus comprises a longitudinally extending enclosure 70, such as a transparent tube, for confining an ionizable working substance 71, such as cesium. A pair of MHD electrodes 73 and 74 are disposed within the enclosure and preferably supported inwardly of the walls by spacers (not shown).

The ionization tube is substantially surrounded by radiation guide means 75 such as an elongated cylindrical reflecting surface for maintaining radiative energy within the ionization tube. Also surrounding the tube along its longitudinal extent are magnetic means 76, such as nickel-cobalt permanent magnets, for forming a core unity magnetic containment bottle to confine moving charged particles preferably inwardly of the walls of the ionization tube while they pass therethrough and to concentrate such particles along the longitudinal axis of the tube. A second magnetic means 77, such as a permanent magnet, forms a field for directing particles to MHD electrodes 73 and 74 for the generation of electricity. Advantageously, a third magnetic means 78, such as a conducting magnet, is provided for generating a pulsing field pinching charged particles in the direction of the electrodes to facilitate start-up. It is contemplated that in generators for deployment in remote locations, magnet 78 can be driven by photovoltaic cells in combination with a capacitor discharge circuit (not shown).

In this apparatus, the magnetic containment bottle acts to prevent escape of hot charged particles radially outward of the magnetic bottle. Thus, the bottle confines the particles within and away from the walls of the ionization tube, thereby minimizing heating and contamination of the walls.

In operation, solar radiative energy is applied in a longitudinal direction through the enclosure by a solar collector 79 in combination with radiation guide means 75. The collector is preferably a generally parabolic reflecting surface having a focus 80 on a major axis to which substantially parallel rays of solar radiation are focused. The enclosure 70 and the surrounding radiation guide are preferably so positioned in relation to the parabolic reflecting surface that the solar radiation is focused within the guide tube, and the longitudinal axis of enclosure 70 is aligned along the major axis of the collector. When solar radiation, initially concentrated at the focal point within enclosure 70 passes from the enclosure, it impinges on the reflecting surface 75 which reflects it back into the enclosure.

Residual radiation passing longitudinally through the enclosure is preferably recycled by reflecting means 81 positioned for reflecting the residual radiation back through the enclosure along the longitudinal axis.

Recombined working fluid is preferably recycled from the rear end portion of the enclosure to the front end portion by a return conduit 82.

6. The Steps Of The Method (FIG. 9)

Figure 9:
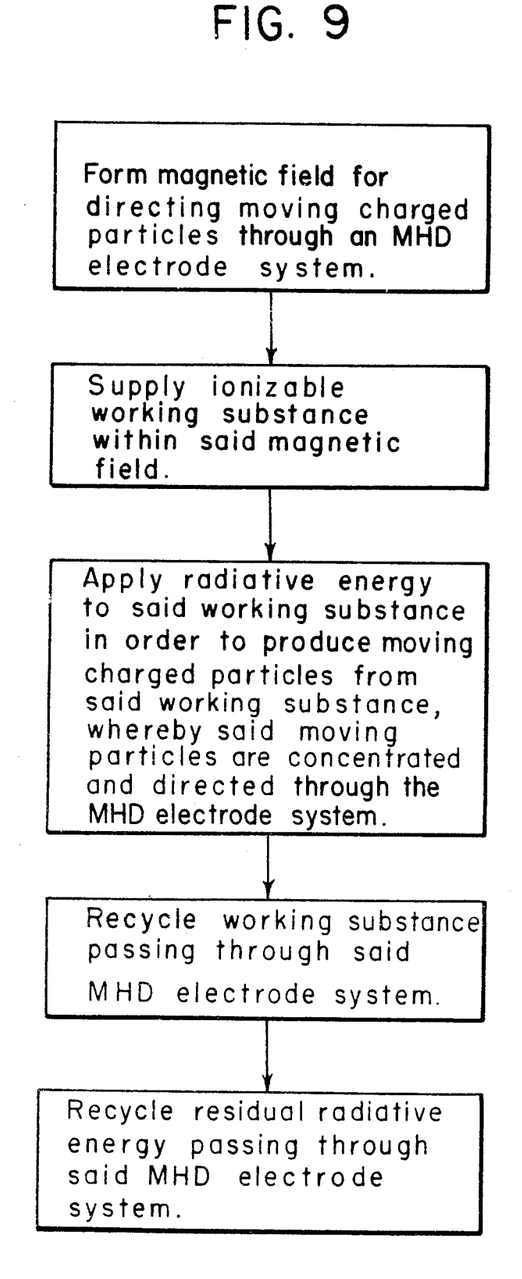
FIG. 9 is a flow diagram illustrating the steps of a preferred method of converting radiative energy into electrical energy.

The steps of the preferred method for converting radiative energy to electrical energy using a MHD electrode are illustrated in the flow diagram of FIG. 9.

As illustrated, the initial step involves forming a magnetic field for directing moving charged particles through an MHD electrode system. This field can also be advantageously used to substantially confine the moving charged particles to a desired region of space. The magnetic field can be produced by either superconducting, conducting, or permanent magnets.

The next step involves supplying an ionizable working substance within the magnetic field. This step is readily accomplished by disposing an enclosure containing the working substance within the field. Many working substances can be used. Alkali metals are preferred and cesium is generally considered advantageous for these applications although gases or gaseous and vapor mixtures are as advantageous for certain applications.

The third step involves applying radiative energy to the working substance in order to produce moving charged particles from the working substance by charge transfer processes. It is important to note that the charged particles are produced by charge transfer processes and not by chemical reaction. This difference is significant, for it signifies, in large part, the difference between old methods requiring, for example, the burning of fossil fuels and the present method which directly converts radiative energy into electrical energy without combustion reactions In contrast with systems producing non-reusable combustion products, the process of this application using charge transfer ionization produces a nonequilibrium plasma which can be recombined and reused in a fully enclosed system. Charge transfer processes cause an ejection of an electron from a neutral atom and recombination brings the atom back to its neutral state wherein it can be used again.

Upon their production, the moving charged particles are magnetically confined and by magnetic compression into a nonequilibrium plasma core, that is, directed through the MHD electrode system where they generate an electrical output.

The next step involves cycling the recombined working substance passing through the MHD electrode system so that a closed cycle system is obtained; and the final step involves cycling residual radiation passing through the MHD electrode system in order to maintain high conversion efficiencies.

While the invention has been described in connection with only a small number of specific embodiments, it is to be understood that these are merely illustrative of the many other specific embodiments which can also utilize the principles of the invention. Numerous and varied devices can be made by those skilled in the art without departing from the spirit and scope of the invention.

I claim:

1. A process for converting radiative energy to electrical energy utilizing a MHD electrode system, comprising the steps of:
    (a) forming a magnetic field for directing a concentration of charged particles through a MHD electrode system in a fully enclosed electrical energy generating system:
    (b) supplying an ionizable working substance within said magnetic field;
    (c) applying radiative energy to said ionizable substance in said magnetic field to produce moving charged particles from said working substance that are directed through said MHD electrode system to generate electrical energy, said radiative energy being focused and directed one or more times through the charged particle concentration;
    (d) recycling the working substance passing through the MHD electrode system to step (b); and
    (e) recycling radiative energy passing through the MHD electrode system to step (c).

2. A process according to claim 1 wherein said magnetic pinching field is formed to concentrate charged particles into a substantially linear region of space aligned with said MHD electrode system.

3. A process according to claim 2 wherein said radiative energy is directed along said substantially linear region.

4. A process according to claim 3 including the step of directing said radiative energy along said substantially linear region and through said MHD electrode system.

5. A process according to claim 1 wherein said radiative energy is coherent radiation.

6. A process according to claim 1 wherein said radiative energy is non-coherent radiation.

7. A process for converting radiative energy to electrical energy utilizing a MHD electrode system and a substantially ellipsoidal reflecting means having one or more foci along a major axis, said process comprising the steps of:
    (a) forming a magnetic field for concentrating moving charged particles along the major axis and for directing the moving charged particles through said MHD electrode system, said ellipsoidal reflecting means and electrode system constituting a fully enclosed electrical energy generating system;
    (b) directing radiative energy by said reflecting means in such a manner that said radiative energy is reflected through said one or more foci a plural number of times to ionize an ionizable substance to provide moving charged particles, whereby said moving charged particles are compressed by said magnetic field along said major axis and directed through said MHD electrode system for generating electrical energy; and
    (c) recycling the working substance and residual radiative energy passing through the MHD electrode system to step (b).

* * * * *

UNITED STATES PATENT AND TRADEMARK OFFICE
CERTIFICATE OF CORRECTION

PATENT NO. : 4,275,318
DATED : June 23, 1981
INVENTOR(S) : Fred A. Duncan

It is certified that error appears in the above—identified patent and that said Letters Patent is hereby corrected as shown below:

Title page, Abstract, line 11, "are and directed" should be -- are directed --.

Column 2, line 4, "for and directing" should be -- for directing --.

Column 4, lines 28-29, "magnetic compressing" should be -- magnetic compression --.

Column 6, line 54, "confined and by" should be -- confined by --.

Signed and Sealed this

Twenty-fifth Day of August 1981

[SEAL]

Attest:

GERALD J. MOSSINGHOFF

Attesting Officer

Commissioner of Patents and Trademarks